United States Patent [19]
Harrison

[11] 3,739,661
[45] June 19, 1973

[54] AUTOMATIC TRANSMISSION SYSTEM
[75] Inventor: David Blackburn Harrison, Kenilworth, England
[73] Assignee: Joseph Lucas (Industries) Limited, Birmingham, England
[22] Filed: Mar. 1, 1972
[21] Appl. No.: 230,841

[30] Foreign Application Priority Data
　　Mar. 5, 1971　Great Britain...................... 6,208/71

[52] U.S. Cl................................ 74/866, 74/752 D
[51] Int. Cl............................ B60k 21/00, F16h 3/74
[58] Field of Search........................... 74/866, 752 D

[56]　　　　References Cited
　　　　UNITED STATES PATENTS
3,267,762　8/1966　Reval................................ 74/866 X
3,439,564　4/1969　Scholl et al........................... 74/866
3,604,288　9/1971　Mori................................. 74/866 X
3,626,254　12/1971　Kawakubo et al................ 74/866 X Primary Examiner—Arthur T. McKeon
Attorney—John C. Holman and Marvin R. Stern

[57]　　　　ABSTRACT

A circuit for controlling an automatic transmission system for an engine includes a resistor for supplying a third signal to the input of a summing amplifier, means for supplying a second signal representative of the speed of the vehicle, to the input of the summing amplifier and a transistor for supplying a first signal to the input of the summing amplifier only when the throttle setting of the vehicle exceeds a predetermined value. The arrangement being such that when the second signal exceeds the third signal or the third and first signals together, the circuit will operate to effect a ratio change to reduce the engine speed for a given road speed and vice versa.

Figure 3:
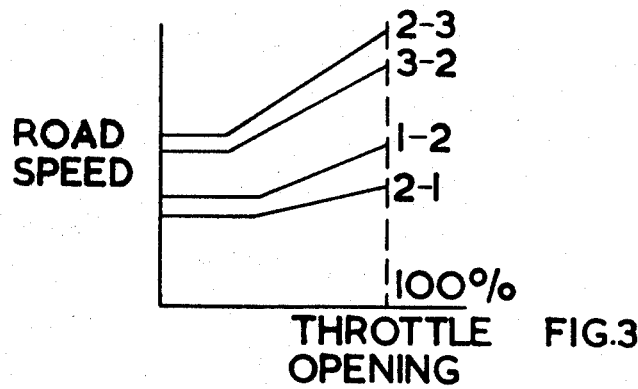

5 Claims, 5 Drawing Figures 3,739,661

AUTOMATIC TRANSMISSION SYSTEM

This invention relates to circuits for controlling the operation of a vehicle automatic transmission system, the system including an electromagnetic device which is energized when it is required to effect a speed ratio change in one direction and de-energized when it is required to effect the same ratio change in the opposite direction.

The object of the invention is to provide such a circuit in a simple and convenient form.

A circuit in accordance with the invention comprises in combination, means for generating a first signal representative of the throttle setting of the vehicle engine, said means producing said first signal only when the throttle setting is above a predetermined value, means for generating a second signal the magnitude of which is dependent upon the road speed of the vehicle, means for generating a third and fixed signal, means for comparing said signals the arrangement being such that when said second signal exceeds said third signal or said third signal and Said first signal the circuit will operate to effect a ratio change to reduce the engine speed for a given road speed and vice versa.

Figure 1:
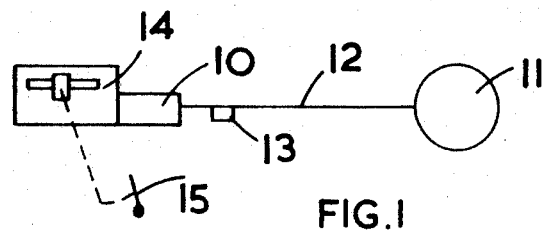
Figure 2:
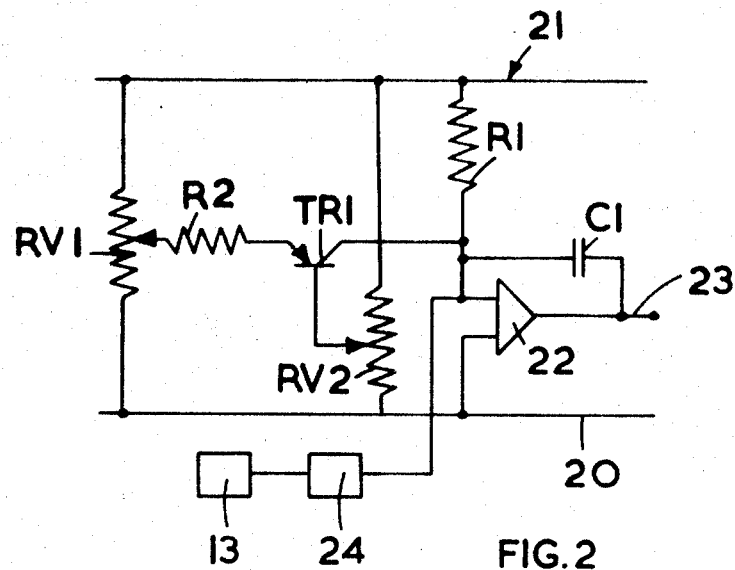
Figure 4:
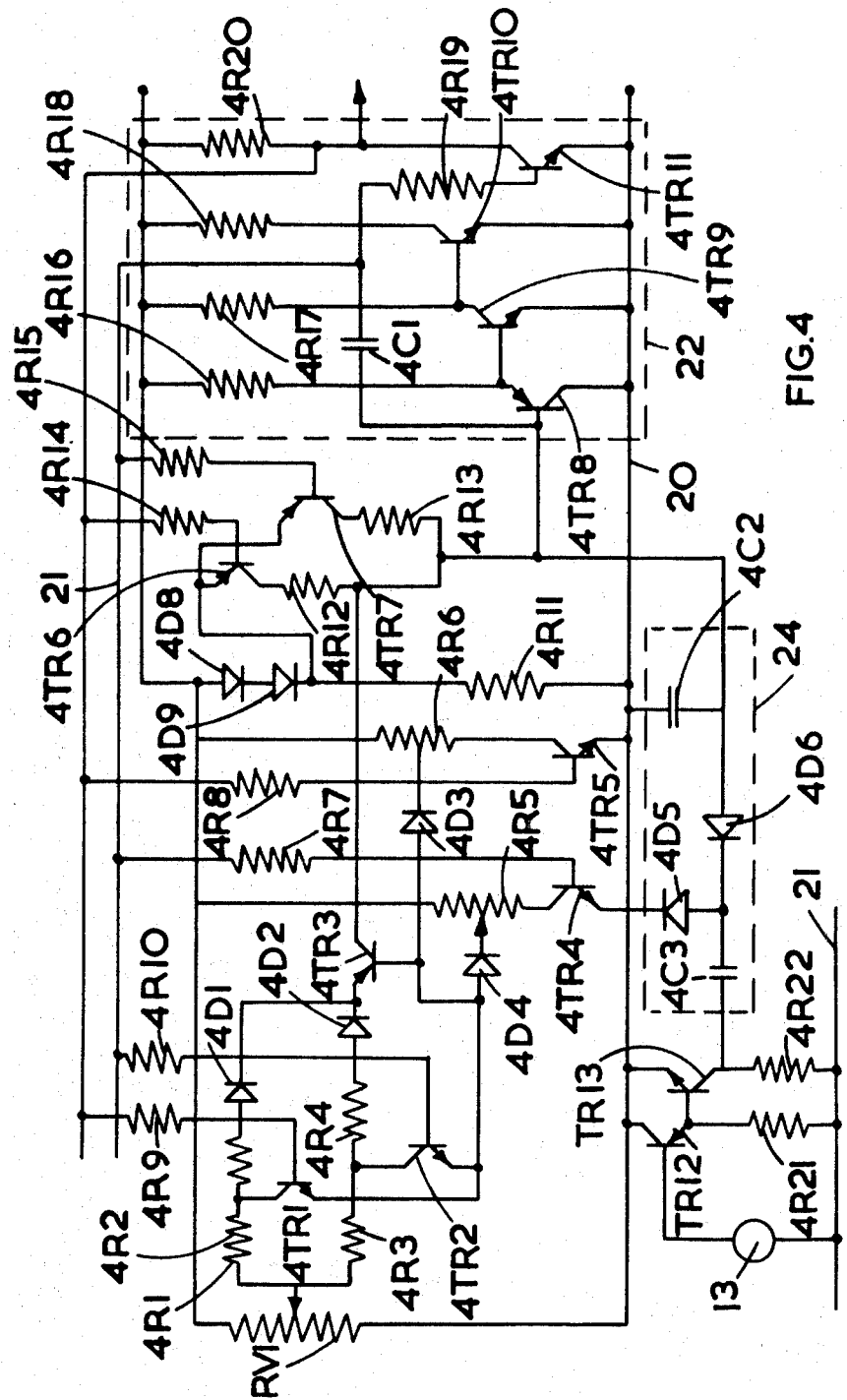
Figure 5:
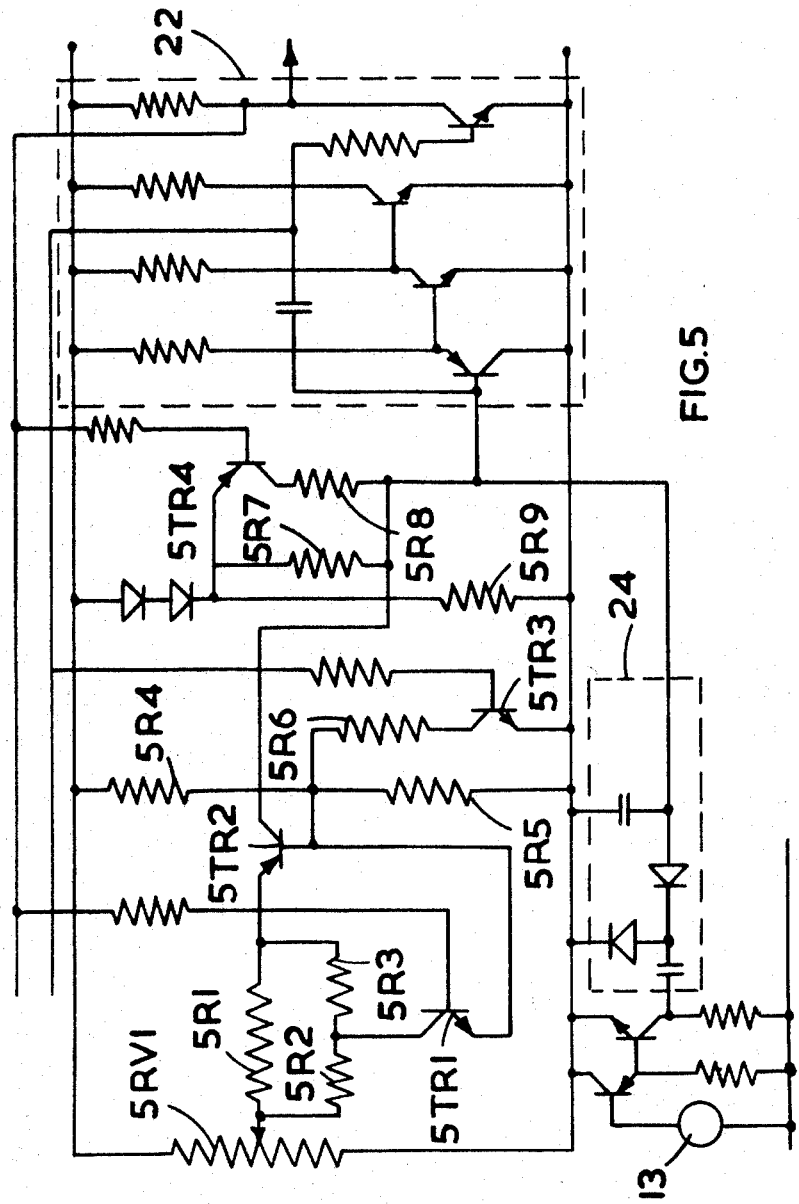

Examples of control circuits in accordance with the invention will now be described with reference to the accompanying drawings in which:

FIG. 1 shows a schematic layout of the engine of a vehicle and its attendant transmission system, FIG. 2 is a simplified circuit diagram of the control circuit, FIG. 3 is a graph showing the operating characteristics of the system, FIG. 4 shows one arrangement of part of the system, and FIG. 5 shows a modified form of the arrangement of FIG. 4.

Referring to the drawings the vehicle transmission system includes an automatic gear box 10 which is coupled to the road wheels 11 by means of a drive shaft 12. Also provided is a generator 13 which provides an alternating current signal the frequency of which is dependant upon the road speed of the vehicle. The automatic gear box is coupled to the engine 14 of the vehicle and this includes a throttle control 15.

Referring now to FIG. 3 this shows in graph form, the points at which a ratio change of the gear box should take place depending upon the throttle opening and the road speed of the vehicle. It will be noticed that two ratio changes are shown on the graph, i.e., that between first and second gear and between second and third gear. Considering the ratio change between first and second gear it will be seen that the change from first gear to second gear takes place at a higher speed for a given throttle opening than the change between second gear and first gear. This is to avoid two difficulties which may arise with automatic transmission systems. One of these difficulties being that during a ratio change the road speed of the vehicle may fall and secondly it is desirable that the change point in one direction for a given ratio should be spaced from the change point in the opposite direction for the same ratio, to avoid hunting.

Referring now to FIG. 2, this shows a simplified form of the circuit which will be described later with reference to FIG. 4. The circuit includes supply lines 20 and 21 for connection respectively to the negative and positive terminals of a source of d.c. supply. Connected between the supply lines is a potentiometer RV1 the slider of which is connected by way of resistor R2, to the emitter terminal of p-n-p transistor TR1. The base terminal of this transistor is connected to the slider of potentiometer RV2 the resistance element of which is connected between the supply lines 20 and 21. The collector terminal of transistor TR1 is connected to supply line 21 by way of resistor R1 and also to the input of a summing amplifier 22. The output terminal 23 of this amplifier is connected to control an electromagnetic decice which when operated effects a ratio change of the automatic gear box. In addition, the output terminal 23 is connected to the input terminal of the amplifier by way of capacitor C1.

Also connected to the input terminal of the amplifier is the output of a diode pump circuit 24 which is supplied with an alternating voltage from the tacho generator 13 the diode pump provides a second signal.

The position of the slider of the potentiometer RV1 is determined by the setting of the throttle control 15 of the engine. The combination of potentiometer RV1, resistor R2, potentiometer RV2 and transistor TR1 produce a first signal which is supplied to the input terminal of the amplifier 22 and which is depending upon the throttle setting. In addition resistor R1 provides a third signal. The first and third signals are opposed by the second signal produced by the diode pump circuit 24 and when the first and third signals exceed the second signal, the summing amplifier 22 is in one condition and in this condition the first gear of the transmission system is selected. For a constant throttle setting the speed of the vehicle will gradually rise until a speed is attained at which the second signal exceeds the first and third signals and the summing amplifier will change state so that second gear will be selected.

The setting of the slider of potentiometer RV2 determines the point to which the throttle must be opened before any increase in the speed at which a gear change occurs is caused. This is because below this point transistor TR1 will be in a non conducting state and the only current supplied to the input of the amplifier will be that flowing by way of resistor R1. This resistor sets the value of the speed at which the vehicle must travel to effect a change of ratio with zero throttle opening. The value of resistor R2 sets the slope of the inclined portion of the curves shown in FIG. 3. In order to achieve rapid switching of the amplifier positive feed back is provided by capacitor C1. The circuit shown in FIG. 2 is of course simplified and does not provide the difference in road speeds for a given throttle setting, at which the up change and down change occur.

Reference will now be made to FIG. 4 in which the d.c. supply leads are reference 20 and 21 for connection to the negative and positive terminals of a source of d.c. supply respectively. Connected across the supply leads is potentiometer 4RV1 the slider of which is connected by way of resistor 4R3 and 4R4 in series to the anode of diode 4D2. The cathode of this diode is connected to the emitter terminal of p-n-p transistor 4TR3. Moreover, the slider of potentiometer 4RV1 is connected by a similar path to the emitter of transistor 4TR3 by way of resistors 4R1 and 4R2 connected in series with diode 4D1. The base terminal of transistor 4TR3 is connected by way of diode 4D4 to the slider of potentiometer 4R5. One end of the resistance element of this potentiometer is connected to the supply line 21 and the other end of the resistance element is connected by way of the emitter collector path of n-p-n transistor 4TR4. The emitter of this transistor is connected to the supply line 20. In addition there are provided n-p-n transistors 4TR1 and 4TR2 the emitter terminals of which are connected to the anode of diode 4D4. The collector terminals of the transistors are connected respectively to points intermediate resistors 4R1 and 4R2 and 4R3 and 4R4.

The base terminal of transistor 4TR3 is connected by way of diode 4D3 to the slider of potentiometer 4R6. One end of the resistance element of this potentiometer is connected to the supply line 21 and the other end of the element is connected to supply line 20 by way of the emitter collector path of n-p-n transistor 4TR5.

In addition there is provided resistor 4R11 one end of which is connected to supply line 20 and the other end of which is connected to supply line 21 by way of diodes 4D8 and 4D9 in series, the cathodes of the diodes being directed towards the supply line 21. A point intermediate the diode 4D9 and the resistor 4R11 is connected to the emitter terminals of p-n-p transistors 4TR6 and 4TR7. The collector terminals of these transistors are connected respectively by way of resistors 4R12 and 4R13 to the collector terminal of transistor 4TR3.

The summing amplifier is indicated by the circuitry enclosed within the dotted line 22 and it comprises p-n-p transistor 4TR8 having its collector connected to supply line 20 and its base terminal connected to the collector terminal of transistor 4TR3. The emitter terminal of transistor 4TR8 is connected to supply line 21 by way of resistor 4R16 and also to the base terminal of n-p-n transistor 4TR9. The emitter terminal of this transistor is connected to supply line 20 and the collector terminal is connected to the supply line 21 by way of resistor 4R17. Moreover, the collector terminal of transistor 4TR9 is connected to the base terminal of n-p-n transistor 4TR10 the emitter terminal of which is connected to supply line 20. The collector terminal of this transistor is connected to supply line 21 by way of resistor 4R18 and also to the base terminal of n-p-n transistor 4TR11 by way of resistor 4R19. The emitter terminal of transistor 4TR11 is connected to supply line 20 and the collector terminal is connected to supply line 21 by way of resistor 4R20. The output from the circuit is derived from the collector terminal of transistor 4TR11. The feed back capacitor 4C1 is connected between the base terminal of transistor 4TR8 and the collector terminal of transistor 4TR10. The collector terminal of transistor 4TR10 is additionally connected to the base terminal of transistor 4TR7 by way of resistor 4R15, the base terminal of transistor 4TR4 by way of resistor 4R7 and the base terminal of transistor 4TR2 by way of resistor 4R10. Moreover, the collector terminal of transistor 4TR11 is connected to the base terminal of transistor 4TR6 by way of resistor 4R14, the base terminal of transistor 4TR5 by way of resistor 4R8 and the base terminal of transistor 4TR1 by way of resistor 4R9.

The tachometer generator is indicated at 13 and the diode pump circuit is indicated at 24. This latter circuit comprises an input capacitor 4C3 which is connected to the anode of diode 4D5 the cathode of which is connected to supply line 20. In addition the capacitor is connected to the cathode of diode 4D6 the anode of which is connected to the base terminal of transistor 4TR8. Moreover, a capacitor 4C2 is provided between the anode of diode 4D6 and the supply line 20. The tachometer generator is connected to the base terminal of a p-n-p transistor 4TR12 the collector terminal of which is connected to the supply line 20 and the emitter terminal of which is connected by way of resistor 4R21 to supply line 21. In addition the emitter terminal of transistor 4TR12 is connected to the base terminal of n-p-n transistor 4TR13. The emitter of this transistor is connected to the supply line 20 and the collector terminal is connected to the supply line 21 by way of resistor 4R22. The collector of transistor 4TR13 is connected to the capacitor C3.

In operation, the summing amplifier operates as described with reference to the example shown in FIG. 2 and this also applies with respect to the tachometer generator and the associated diode pump 24.

The summing amplifier 22 is however used to switch from the 1-2 and 2-1 characteristic and it will be noted that when transistor TR10 is turned off the base terminals of all the transistors which are connected through their respective resistors, will be substantially at the voltage on the supply line 21. At the same time transistor 4TR11 will be turned on and therefore the base terminals of the transistors which are connected through their respective resistors, to the collector of transistor 4TR11 will be substantially at the potential of supply line 20. Transistor 4TR3 corresponds to the transistor TR1 of FIG. 1. Resistors 4R1 and 4R2 set the slope of the 1-2 change curve whilst resistors 4R3 and 4R4 set the slope of the 2-1 curve. Potentiometer 4R5 corresponds to potentiometer RV2 of FIG. 2 and sets the throttle opening which is necessary before an increase in road speed is necessary to achieve a 1-2 change. Similarly potentiometer 4R6 sets the throttle opening necessary before an increase in road speed is necessary to achieve a 2-1 change. Resistors 4R12 and 4R13 correspond to resistor R1 of FIG. 2 and resistor 4R12 sets the road speed for a zero throttle 1-2 change whilst resistor 4R13 sets the road speed for a zero throttle 2-1 change.

By way of example assuming that the mechanism is in first gear, transistor 4TR11 will be switched on and transistor 4TR2 will be turned on. Any current contribution derived from resistors 4R3 and 4R4 is shorted out by transistor 4TR2 and the slope of the 1-2 curve is set by resistors 4R1 and 4R2 only. When the road speed increases sufficiently to switch the amplifier, transistor 4TR11 is turned off and transistor 4TR2 is also turned off whilst transistor 4TR1 is turned on. The slope of the 2-1 curve is now set solely by resistors 4R3 and 4R4 and the contribution from resistors 4R1 and 4R2 is shorted out by transistor 4TR1. Diode 4D1 ensures that in first gear current does not flow through resistor 4R4 and diode 4D2 ensures that when in second gear current does not flow through resistor 4R2. Transistors 4TR4 and 4TR5 are used to switch between the two throttle openings at which the change in the shift point occurs.

Transistors 4TR6 and 4TR7 operate in a similar manner however, it has been found that diodes 4D8 and 4D9 together with resistor 4R11 are necessary since when for instance transistor 4TR11 is switched on transistor 4TR10 will be switched off. However, its collector voltage will not be quite equal to the voltage on the supply line 21 and in this event transistor 4TR7 may not be turned off but in order to ensure that this is the case its emitter is maintained at a voltage less than its collector by reason of diodes 4D8 and 4D9 which are connected in series with resistor R11. In other words the emitter terminals of both transistors 4TR6 and 4TR7 will always be at a voltage which is slightly less than the voltage on the supply line 21.

The circuit described with reference to FIG. 4 enables by adjustment of the values of the various resistors, any desired shape of the 1-2 and 2-1 curves. The circuit which is shown in FIG. 5 corresponds closely with the circuit of FIG. 4 however, it is simplified for the purpose of production. In general transistor 5TR2 corresponds to transistor 4TR3 of FIG. 4. The emitter circuit of transistor 5TR2 includes resistors 5R1, 5R2 and 5R3 and the value of this combination is altered depending upon whether transistor 5TR1 is conductive or non conductive. In similar manner tapped resistors 4R5 and 4R6 are replaced by resistors 5R4, 5R5 and 5R6, the value of the resistance being dependent upon the state of transistor 5TR3. Resistors 4R12 and 4R13 are replaced by resistor 5R7 the effective value of the resistor being altered when transistor 5TR4 is conductive by resistor 5R8.

I claim:

1. A circuit for controlling the operation of a vehicle automatic transmission system and comprising in combination, means for generating a first signal representative of the throttle setting of the vehicle engine, said means producing said first signal only when the throttle setting is above a predetermined value, means for generating a second signal the magnitude of which is dependent upon the road speed of the vehicle, means for generating a third and fixed signal, means for comparing said signals the arrangement being such that when said second signal exceeds said third signal or said third signal and said first signal the circuit will operate to effect a ratio change to reduce the engine speed for a given road speed and vice versa.

2. A circuit as claimed in claim 1 in which the means for producing the first signal includes a transistor means for setting the base voltage of said transistor whereby the throttle setting at which said first signal is produced may be set, and means for applying a voltage to the emitter of said transistor, the magnitude of said voltage depending upon the throttle setting.

3. A circuit as claimed in claim 2 in which said means for comparing said signals comprises a summing amplifier, said first, second and third signals being supplied to the input of the amplifier, and the amplifier switching from one state to another when said second signal exceeds or falls below said first and third signals.

4. A circuit as claimed in claim 3 including switch means responsive to the condition of the summing amplifier for modifying said first and third signals whereby the road speed at which the amplifier switches will vary.

5. A circuit as claimed in claim 4 in which said third signal is supplied to the input of the amplifier through a first resistor, the emitter circuit of said transistor including a second resistor, and the base circuit of said transistor including a third resistor, said switch means comprising three transistors switchable to vary the resistances of said resistor respectively.

* * * * *